United States Patent [19]

MacDonald et al.

[11] Patent Number: 5,504,453
[45] Date of Patent: Apr. 2, 1996

[54] METHOD AND DEVICE FOR ESTIMATING PHASE ERROR

[75] Inventors: Andrew MacDonald, Damascus; Richard Clewer, Ijamsville; Janavikulam Anandkumar, Gaithersburg, all of Md.

[73] Assignee: Hughes Aircraft Company, Los Angeles, Calif.

[21] Appl. No.: 323,283

[22] Filed: Oct. 14, 1994

[51] Int. Cl.$^6$ .................................................. H04L 27/22
[52] U.S. Cl. ............................ 329/304; 375/324; 375/329
[58] Field of Search ................................... 329/304, 305, 329/306, 307, 308, 309, 310; 375/324, 329

[56] References Cited

U.S. PATENT DOCUMENTS 4,796,188  1/1989  Gale et al. ............................... 364/443

Primary Examiner—Siegfried H. Grimm
Attorney, Agent, or Firm—Gordon R. Lindeen, III; Wanda K. Denson-Low

[57] ABSTRACT

A method and apparatus for use in estimating phase error in a phase-modulated carrier. The method and apparatus of the present invention may be embodied in a phase-error-estimator circuit which is typically incorporated into a demodulator of a digital communications receiver. In general, the phase-error-estimator circuit receives the I and Q components of a phase-modulated signal, and outputs an estimate of the phase error, if any, in the phase-modulated carrier signal associated with the received I and Q. Preferably, the phase-error-estimator circuit includes an index/polarity generator circuit coupled to a look-up table. The index/polarity generator receives I and Q and maps them onto a reduced range of phase angles represented by values X and Y. X and Y are fed to a reduced and substantially triangular look-up table which outputs the stored phase-error-estimate for the particular X and Y inputs.

33 Claims, 2 Drawing Sheets

METHOD AND DEVICE FOR ESTIMATING PHASE ERROR

BACKGROUND OF THE INVENTION

Conventional communications systems include a transmitter for generating waveforms, a transmission medium for transporting the generated waveforms, and a receiver for receiving and processing transmitted waveforms. On the transmission side, information may be digitally encoded into a data stream using a number of algorithms. The encoded data stream is modulated on a carrier by one or more modulation techniques, including for example one of the several forms of phase-shift-keying (PSK). In the receiver, the original data stream is recovered by reversing the processing steps performed in the transmitter, and also by compensating for noise and other errors added to the signal during transmission and reception.

A demodulator is typically provided on the receiving end for performing a number of tasks. In a PSK modulated system, PSK demodulators translate the received signal into in-phase (I) and quadrature (Q) components, and then recover the transmitted message from I and Q. PSK demodulators also perform phase synchronization, which involves making an estimate of the absolute carrier phase.

In "closed loop" phase synchronization, a phase error detector detects the presence of a carrier phase error, and an estimate of the carrier phase error is calculated and fed back to the phase synchronizer. In general, an estimate of the carrier phase error associated with I and Q may be determined by calculating an arctangent. The arctangent, however, is a complicated calculation that would be difficult to perform for every received symbol. Accordingly, the appropriate arctangent calculations are typically stored in a look-up table in the demodulator's memory (ROM or RAM). Assuming that the value range of the look-up table spans from negative 128 to positive 127 for both I and Q, and assuming that the phase-error-estimate is represented by an 8-bit word, the required look-up table would occupy 256× 256×8 memory spaces, or approximately 64 Kbytes of memory.

Accordingly, it would be beneficial to provide a method and apparatus for estimating phase errors in a phase-modulated signal, whereby the amount of ROM or RAM needed to store a phase-error-estimate look-up table is reduced.

SUMMARY OF THE INVENTION

The present invention provides a method and apparatus for estimating phase errors in a phase-modulated signal. The method and apparatus of the present invention may be embodied in a phase-error-estimator circuit which is preferably part of a demodulator located at the receiving end of a digital communications receiver. Preferably, the demodulator is an application-specific-integrated circuit (ASIC) having on-board RAM and/or ROM capable of storing a look-up table. In general, the phase-error-estimator circuit receives I and Q components of the received phase-modulated signal, and outputs an estimate of the phase error, if any.

The phase-error-estimator circuit preferably includes an index/polarity generator circuit coupled to a look-up table. The index/polarity generator receives I and Q having carrier phase information falling within a first range. The index/polarity generator maps the received carrier phase onto a second range of values represented by indices X and Y, and a "sign" (SGN) symbol. Preferably the second range is smaller than the first range. The X and Y indices are fed to a reduced and substantially triangular look-up table which outputs the stored arctangent phase-error-estimate (f(x,y)) associated with the X and Y indices. The SGN output from the index/polarity generator is multiplied by the look-up table's output (f(x,y)) to account for both positive and negative phase errors. The resultant phase-error-estimate output from the phase-error-estimator circuit is preferably supplied to other components which perform phase compensation and/or adjustment operations.

More particularly, the device of the present invention provides a first circuit receiving a first signal having a first carrier phase within a first range. The first circuit translates the first carrier phase into a second phase falling within a second range. The second phase is associated with indices that point to a stored value in a look-up table.

In the method of the present invention, a phase-modulated signal is received having a first carrier-phase falling within a first range. The phase-modulated signal is translated into a second value associated with a second carrier-phase falling within a second range. The second value is provided to a look-up table which outputs a stored value associated with the second value.

In a preferred embodiment of the invention, the phase-modulated signal includes I and Q components. The second signal comprises a first look-up table index (X) and a second look-up table index (Y).

In a further preferred embodiment of the invention, the translation of the phase-modulated signal includes the following steps: 1) determine whether Q is greater than or equal to approximately zero, 2) if Q is greater than or equal to approximately zero, set X equal to I, and set Y equal to Q, and 3) if Q is less than approximately zero, set X equal to I, and set Y equal to a negative of Q.

In a further preferred embodiment of the invention, the translation of the phase-modulated signal includes the following steps: 1) determine a product (P) that results from multiplying I by the square root of two, 2) determine a product (P') that results from multiplying Q by the square root of two, 3) set a value II equal to the sum of P' and P, 4) set a value QQ equal to a sum of P' and negative P, 5) determine whether QQ is greater than or equal to approximately zero, 6) if QQ is greater than or equal to approximately zero, set X equal to II, and set Y equal to QQ, and 7) if QQ is less than approximately zero, set X equal to II, and set Y equal to negative QQ.

As described in greater detail below, by employing the method and apparatus of the present invention, significant memory space is saved. Additionally, the method and apparatus of the present invention may be implemented using a relatively simple circuit and low-cost logic components.

The invention itself, together with further objects and attendant advantages, will best be understood by reference to the following detailed description, taken in conjunction with the accompanying drawings.

DETAILED DESCRIPTION OF THE DRAWINGS

In a phase-modulated digital communications system using, for example, 8-PSK modulation, a transmitter sends data packets, each of which is represented by one of eight symbols, S0 to S7. The transmitted signal may be represented as $A_0 \cos(w_0 t + \theta_i + \Phi)$, wherein: $A_0$ is the signal amplitude; $w_0 t$ is the carrier component of the phase; $\theta_i$ is the modulation portion of the phase; and $\Phi$ is an unknown reference phase. Using 8-PSK modulation, the modulation portion $\theta_i$ may be one of eight evenly spaced values between zero and $2\pi$ or 360 degrees, and each of the eight values represents one of the eight symbols, S0 to S7.

On the receiving end, a phase synchronizer must generate an estimate ($\Phi'$) of the unknown phase reference $\Phi$. Closed loop phase synchronizers use phase error estimators to estimate the actual phase error ($\epsilon$) between the actual phase reference $\Phi$ and the estimated phase reference $\Phi'$ (i.e., $\epsilon = \Phi - \Phi'$). The phase error estimator does not exactly know $\Phi$, and therefore does not exactly know $\epsilon$. Thus, the phase error estimator must generate an estimate $\epsilon'$ of the actual phase error $\epsilon$.

In general, a phase-error-estimate $\epsilon'$ may be determined using a number of calculations known in the art. In the disclosed embodiment, $\epsilon'$ is determined by calculating arctangent of the received I and Q components. Rather than incur the expense and complexity of providing the needed circuitry for calculating the arctangent function for each received I and Q value, conventional phase error estimator circuits utilize look-up tables to store the required calculations and access them as needed. Known estimator circuits that make use of look-up tables require a significant amount of memory. If, for example, I and Q were each quantized into 256 levels, and the phase-error-estimate were represented in the table as a one byte word, then the look-up table would use a 64 Kbyte memory.

The method and apparatus of the present invention provides a novel way to associate I and Q values with $\epsilon'$, wherein I, Q, and a hard decision symbol estimate (HD) are used to generate the indices for a compact look-up table. Minimizing the size of the ROM or RAM used to store the phase-error-estimate look-up table is important when designing a demodulator phase synchronizer. This is particularly true when the demodulator is an ASIC design, because on-chip ASIC ROM is at a premium. The present invention employs a minimum amount of circuitry to dramatically reduce the size of the look-up table without sacrificing phase error estimate accuracy. Using the present invention, an 8-PSK modulated system could utilize a 1.7 Kbyte look-up table without significantly degrading the fidelity of $\epsilon'$.

Figure 1:
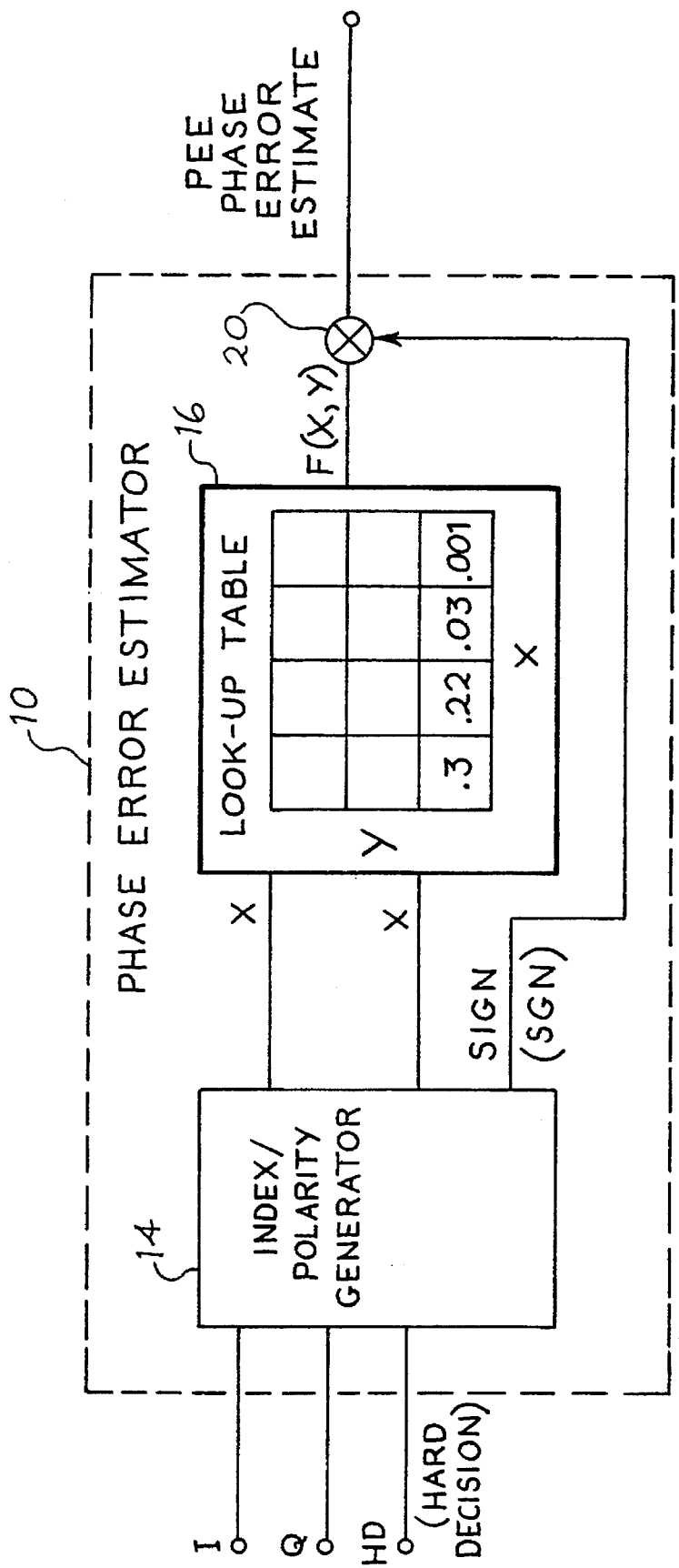
FIG. 1 is a block diagram of a phase-error-estimator circuit embodying the present invention.

FIG. 1 is a block diagram of a phase-error-estimator circuit 10 embodying the method and apparatus of the present invention. The phase-error estimator 10 is preferably implemented as part of a demodulator ASIC (not shown) whose several tasks include demodulation of a phase-modulated digital signal. For each transmitted 8-PSK symbol, the demodulator produces quantized values for I and Q, along with a hard-decision estimate (HD) of the transmitted symbol. I, Q, and HD are provided to the phase-error-estimator circuit 10. The HD signal essentially decides which of the available symbols (S0 to S7) is being represented by the received signal.

I, Q, and HD are input to an index/polarity generator 14 which translates them into the symbols X, Y, along with a "sign" (SGN) or polarity value (+1 or −1). X and Y are provided as indices to a look-up table 16. X and Y point to a look-up table location containing f(x,y) which is an estimate of the phase error for each X and Y. A multiplier 20 multiplies SGN by f(x,y) to generate the phase-error-estimate $\epsilon'$, which equals SGN * f(x,y).

The I and Q values provided to the index/polarity generator 14 have carrier phase information falling within a first range. The index/polarity generator 14 maps the received I and Q components onto a second range of carrier phase values represented by X, Y, and SGN. Preferably the second range is smaller than the first range. This allows the f(x,y) values to be stored in the look-up table 16 as reduced and substantially triangular-shaped memory locations. The SGN symbol accounts for both positive and negative phase errors.

Figure 2:
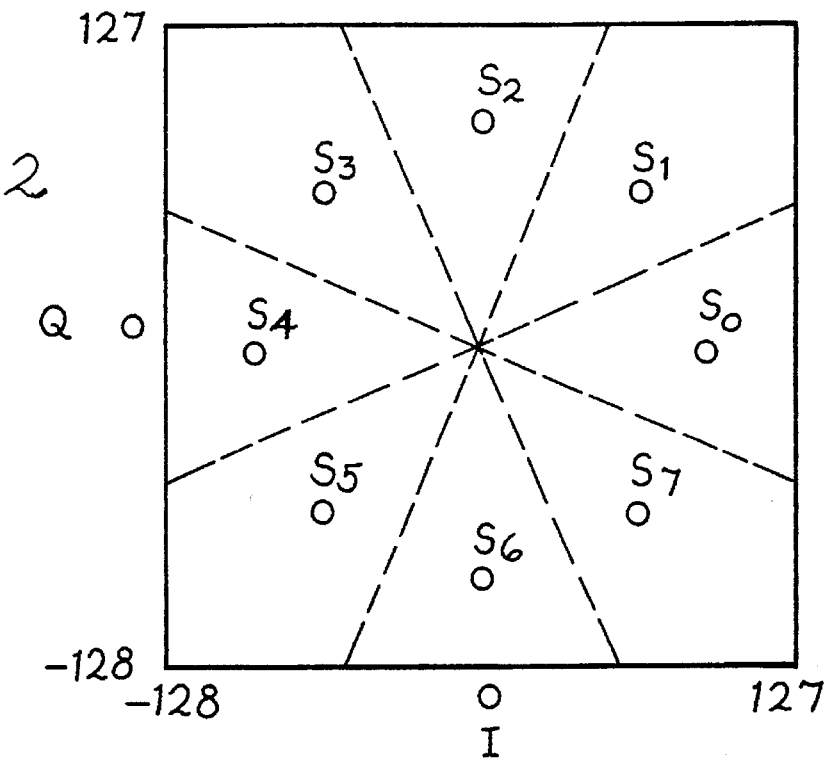
FIG. 2 is a diagram of a full I–Q plane showing an 8-PSK constellation and decision regions.

The details of how I and Q are mapped to X and Y will now be described in connection with FIGS. 2 and 3. FIG. 2 is a diagram of a full I-Q plane showing an 8-PSK constellation (S0 to S7) and decision regions formed by the dashed lines. I is represented along the horizontal axes as having values from negative 128 to positive 127. Q is represented along the vertical axes as having values from negative 128 to positive 127. The constellation points (S0 to S7) are each located at eight equally spaced phase angles (0, 45, 90, 135, 180, 225, 270, and 315) representing the possible received I and Q values when S is sent in noiseless conditions and when perfect automatic gain control is used. The dashed lines form the boundaries of the hard-decision regions. If a received I,Q falls within a region, the HD symbol estimator determines that the transmitted symbol must have been the constellation point within that region. The value of I, Q, and HD are provided to the phase error estimator circuit 10 shown in FIG. 1.

Figure 3:
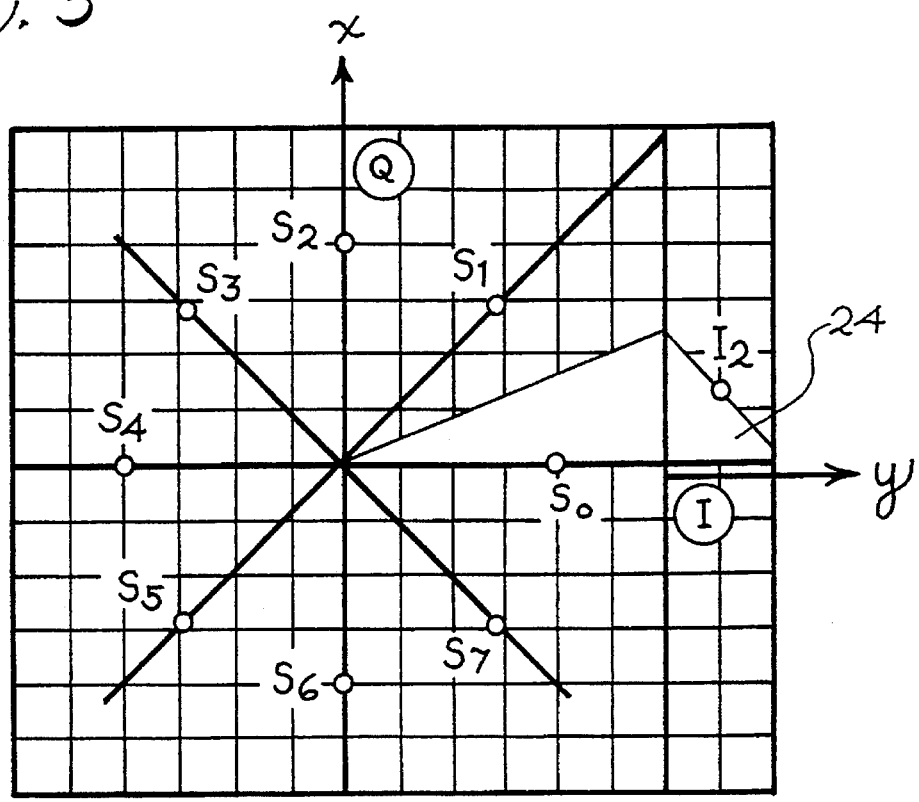
FIG. 3 is a diagram of a reduced I–Q plane showing an 8-PSK constellation and mapped region.

FIG. 3 illustrates an I–Q plane showing an 8-PSK constellation and a substantially triangular-shaped mapped region 24. When I and Q are mapped or translated according to the present invention, they are essentially flipped and rotated on the I–Q plane according to a prescribed protocol so that they fall within the mapped region 24 which may be defined by new indices X, Y. The mapped region 24 occupies approximately 22 and ½ degrees which is significantly less than the 360 degrees occupied by the full 8-PSK constellation.

The mapping or translation is preferably accomplished using I, Q, and HD. The mapped values may be interimly defined as III, QQQ, and SGN. These modified values provide the basis for arriving at the X and Y indices of the look-up table 16 shown in FIG. 1.

The preferred mapping rules are based on the HD value for the symbol. The rule for each symbol is shown below. The square-root of two is referred to as "roottwo."

If *HD* determines that $S = S0$, then
    *II = I*
    *QQ = Q*
    if *QQ* >= 0
        *III = II*
        *QQQ = QQ*
        sign = +1
    else
        *III = II*
        *QQQ = −QQ*
        sign = −1

If *HD* determines that $S = S1$, then
    *P* = root_two**I*
    *P'* = root_two**Q*
    *II = P + P'*
    *QQ = −P + P'*
    if *QQ* >= 0
        *III = II*
        *QQQ = QQ*
        sign = +1
    else
        *III = II*
        *QQQ = −QQ*

-continued
sign = −1

If *HD* determines that S = S2, then
II = Q
QQ = −I
if QQQ > −0
   III = II
   QQQ = QQ
   sign = +1
else
   III = II
   QQ = −QQ
   sign = −1

If *HD* determines that S = S3, then
P = root_two*I
P' = root_two*Q
II = −P + P'
QQ = −P − P'
if QQ >= 0
   III = II
   QQQ = QQ
   sign = +1
else
   III = II
   QQQ = −QQ
   sign = −1

If *HD* determines that S = S4, then
II = −I
QQ = −Q
if QQ >= 0
   III = II
   QQQ = QQ
   sign = −1
else
   III = II
   QQQ = −QQ
   sign = −1

If *HD* determines that S = S5, then
P = root_two*I
P' = root_two*Q
II = −P − P'
QQ = P − P'
if QQ >= 0
   III = II
   QQQ = QQ
   sign = +1
else
   III = II
   QQQ = −QQ
   sign = −1

If *HD* determines that S = S6, then
II = −Q
QQQ = I
if QQ >= 0
   III = II
   QQQ = QQ
   sign = +1
else
   III = II
   QQQ = −QQ
   sign = −1

If *HD*<sub>determines that</sub> S = S7, then
P = root_two*I
10P' = root_two*Q
II = P − P'
QQ = P + P'
if QQ >= 0
   III = II
   QQ = QQ
   sign = +1
else
   III = II
   QQQ = −QQ
   sign = −1

Preferably, two modifications are made to III before generating look-up table indices X and Y. As shown in FIG. 3, all of the 1/16 phase angle sections, each constituting ½ a decision region, are mapped into the mapped region 24. FIG. 3 also shows that some of the III values extend beyond 127. Because the arctangent (QQQ/III) in this region (III>127) is less than 22.5 degrees, III can be modified by limiting it to no more than 127 (IIII<=127) without degrading the phase error estimates significantly.

Also, because QQQ/IIII is less than 0.5 everywhere, QQQ and IIII do not need to have the same granularity. Accordingly, the number of quantization levels of the I component can be reduced by a factor of two without exceeding the maximum phase error estimate "error" of the original 64 Kbyte table. Accordingly, X equals IIII/2, and Y equals QQQ.

The mapped region 24 formed by X and Y is triangular, with X ranging from 0 to 63, and Y ranging from 0 to 52 with the restriction that Y<=2.0, tan(22.5 degrees) * X. The resulting table, f(x,y), has approximately 52*(63/2) or 1638 elements. This is considerably less than the 65,536 elements required for a standard look-up table with similar fidelity.

The mapping protocol is essentially a logic protocol and is preferably implemented using low-cost and simple logic components that follow the protocols described herein. The mapping protocol may also be implemented using a general purpose processor or digital-signal-processor (DSP) programmed to execute the mapping protocols described herein.

Of course, it should be understood that a wide range of changes and modifications can be made to the preferred embodiment described above. For example, the specific embodiment disclosed herein covers 8-PSK modulation. However, the general principles of the disclosed mapping scheme could also be applied, with the appropriate modifications, to PSK modulations higher than eight. Additionally, the disclosed mapping scheme could be applied, with the appropriate modification, to other modulation methods such as QAM (quadrature amplitude modulation). It is therefore intended that the foregoing detailed description be regarded as illustrative rather than limiting and that it be understood that it is the following claims, including all equivalents, which are intended to define the scope of this invention.

What is claimed is:

1. An apparatus for estimating phase error in a phase-modulated signal comprising:

a first circuit receiving a first signal having a first carrier phase within a first range;

said first circuit translating said first signal into values associated with a second carrier phase within a second range; and a look-up table receiving said values and outputting a stored value representing an estimate of phase error associated with said values.

2. The apparatus of claim 1 wherein said second range is less than said first range.

3. The apparatus of claim 1 wherein said second range comprises a subset of said first range.

4. The apparatus of claim 1 wherein:

said first circuit comprises logic circuits; and said first signal comprises digital signals.

5. The apparatus of claim 1 wherein:

said first signal comprises in-phase (I) and quadrature (Q) components; and said values comprise an X component and a Y component.

6. The apparatus of claim 5 wherein said stored value comprises a trigonometric calculation.

7. The apparatus of claim 6 wherein said trigonometric calculation comprises an arctangent.

8. The apparatus of claim 5 wherein said first circuit's translation of I and Q comprises:

determining whether Q is greater than or equal to approximately zero;

setting I equal to X, and setting Q equal to Y, if Q is greater than or equal to approximately zero; and setting I equal to X, and setting a negative Q equal to Y, if Q is less than approximately zero.

9. The apparatus of claim 5 wherein said first circuit's translation of I and Q comprises:

determining a product (P) of a square root of two and I;

determining a product (P') of a square root of two and Q;

setting a value II equal to a sum of P and P';

setting a value QQ equal to a sum of a negative of P and P';

determining whether QQ is greater than or approximately equal to zero;

setting II equal to X, and setting QQ equal to Y, if QQ is greater than or equal to approximately zero; and setting II equal to X, and setting a negative of QQ equal to Y, if QQ is less than approximately zero.

10. The apparatus of claim 5 wherein said first circuit's translation of I and Q comprises:

determining whether a negative of I is greater than or equal to approximately zero;

setting Q equal to X, and setting a negative of I equal to Y, if Q is greater than or equal to approximately zero; and setting Q equal to X, and setting a negative of I equal to Y, if Q is less than approximately zero.

11. The apparatus of claim 5 wherein said first circuit's translation of I and Q comprises:

determining a product (P) of a square root of two and I;

determining a product (P') of a square root of two and Q;

setting a value II equal to a sum of a negative of P and P';

setting a value QQ equal to a difference between a negative of P and P';

determining whether QQ is greater than or equal to approximately zero;

setting II equal to X, and setting QQ equal to Y, if QQ is greater than or equal to approximately zero; and setting II equal to X, and setting a negative of QQ equal to Y, if QQ is less than approximately zero.

12. The apparatus of claim 5 wherein said first circuit's translation of I and Q comprises:

setting a value II equal to a negative of I;

setting a value QQ equal to a negative of Q;

determining whether QQ is greater than or equal to approximately zero;

setting II equal to X, and setting QQ equal to Y, if QQ is greater than or equal to approximately zero; and setting II equal to X, and setting a negative of QQ equal to Y, if QQ is less than approximately zero.

13. The apparatus of claim 5 wherein said first circuit's translation of I and Q comprises:

determining a product (P) of a square root of two and I;

determining a product (P') of a square root of two and Q;

setting a value II equal to a difference between a negative of P and P';

setting a value QQ equal to a difference between P and P';

determining whether QQ is greater than or equal to approximately zero;

setting II equal to X, and setting QQ equal to Y, if QQ is greater than or equal to approximately zero; and setting II equal to X, and setting a negative of QQ equal to Y, if QQ is less than approximately zero.

14. The apparatus of claim 5 wherein said first circuit's translation of I and Q comprises:

setting a value II equal to a negative of Q;

setting a value QQ equal to I;

determining whether QQ is greater than or equal to approximately zero;

setting II equal to X, and setting QQ equal to Y, if QQ is greater than or equal to approximately zero; and setting II equal to X, and setting a negative of QQ equal to Y, if QQ is less than approximately zero.

15. The apparatus of claim 5 wherein said first circuit's translation of I and Q comprises:

determining a product (P) of a square root of two and I;

determining a product (P') of a square root of two and Q;

setting a value II equal to a difference between a negative of P and P';

setting a value QQ equal to a sum of P and P';

determining whether QQ is greater than or equal to approximately zero;

setting II equal to X, and setting QQ equal to Y, if QQ is greater than or equal to approximately zero; and setting II equal to X, and setting a negative of QQ equal to Y, if QQ is less than approximately zero.

16. An apparatus comprising:

a first circuit receiving a first signal having a first carrier phase within a first range;

said first circuit translating said first signal into values associated with a second carrier phase within a second range; and a look-up table receiving said values and outputting a stored value associated with said values;

said values comprising an X component and a Y component; and said first circuit dividing said X by two.

17. An apparatus comprising:

a first circuit receiving a first signal having a first carrier phase within a first range;

said first circuit translating said first signal into values associated with a second carrier phase within a second range; and a look-up table receiving said values and outputting a stored value associated with said values;

said first range comprising approximately three-hundred and sixty degrees; and said second range comprising less than ninety degrees.

18. The apparatus of claim 17 wherein said less than ninety degrees comprises approximately twenty-two and ½ degrees.

19. A method of generating estimated of phase error in a phase-modulated signal, the steps comprising:

receiving the phase-modulated signal having a first carrier phase within a first range;

translating said phase-modulated signal into a value having a second carrier phase within a second range; and providing said value to a look-up table for outputting a stored value representing an estimate of phase error associated with said second value.

20. The method of claim 19 wherein said second range is less than said first range.

21. The method of claim 19 wherein said second range comprises a subset of said first range.

22. The method of claim 19 wherein:

phase modulated signal comprises in-phase (I) and quadrature (Q) components; and said value comprises an X component and a Y component.

23. The method of claim 22 wherein the translation of the phase-modulated signal comprises:

determining whether Q is greater than or equal to approximately zero;

setting I equal to X, and setting Q equal to Y, if Q is greater than or approximately equal to zero; and setting I equal to X, and setting a negative of Q equal to Y, if Q is less than approximately zero.

24. The method of claim 22 wherein the translation of the phase-modulated signal comprises:

determining a product (P) of a square root of two and I;

determining a product (P') of a square root of two and Q;

setting a value II equal to a sum of P and P';

setting a value QQ equal to a sum of a negative of P and P';

determining whether QQ is greater than or equal to approximately zero;

setting II equal to X, and setting QQ equal to Y, if QQ is greater than or equal to approximately zero; and setting II equal to X, and setting a negative of QQ equal to Y, if QQ is less than approximately zero.

25. The method of claim 22 wherein the translation of the phase-modulated signal comprises:

determining whether a negative of I is greater than or equal to approximately zero;

setting Q equal to X, and setting a negative of I equal to Y, if Q is greater than or equal to approximately zero; and setting Q equal to X, and setting a negative of I equal to Y, if Q is less than approximately zero.

26. The method of claim 22 wherein the translation of the phase-modulated signal comprises:

determining a product (P) of a square root of two and I;

determining a product (P') of a square root of two and Q;

setting a value II equal to a sum of a negative of P and P';

setting a value QQ equal to a difference between a negative of P and P';

determining whether QQ is greater than or equal to approximately zero;

setting II equal to X, and setting QQ equal to Y, if QQ is greater than or equal to approximately zero; and setting II equal to X, and setting a negative of QQ equal to Y, if QQ is less than approximately zero.

27. The method of claim 22 wherein the translation of the phase-modulated signal comprises:

setting a value II equal to a negative of I;

setting a value QQ equal to a negative of determining whether QQ is greater than or equal to approximately zero;

setting II equal to X, and setting QQ equal to Y, if QQ is greater than or equal to approximately zero; and setting II equal to X, and setting a negative of QQ equal to Y, if QQ is less than approximately zero.

28. The method of claim 22 wherein the translation of the phase-modulated signal comprises:

determining a product (P) of a square root of two and I;

determining a product (P') of a square root of two and Q;

setting a value II equal to a difference between a negative of P and P';

setting a value QQ equal to a difference between P and P';

determining whether QQ is greater than or equal to approximately zero;

setting II equal to X, and setting QQ equal to Y, if QQ is greater than or equal to approximately zero; and setting II equal to X, and setting a negative of QQ equal to Y, if QQ is less than approximately zero.

29. The method of claim 22 wherein the translation of the phase-modulated signal comprises:

setting a value II equal to a negative of Q;

setting a value QQ equal to determining whether QQ is greater than or equal to approximately zero;

setting II equal to X, and setting QQ equal to Y, if QQ is greater than or equal to approximately zero; and setting II equal to X, and setting a negative of QQ equal to Y, if QQ is less than approximately zero.

30. The method of claim 22 wherein the translation of the phase-modulated signal comprises:

determining a product (P) of a square root of two and I;

determining a product (P') of a square root of two and Q;

setting a value II equal to a difference between a negative of P and P';

setting a value QQ equal to a sum of P and P';

determining whether QQ is greater than or equal to approximately zero;

setting II equal to X, and setting QQ equal to Y, if QQ is greater than or equal to approximately zero; and setting II equal to X, and setting a negative of QQ equal to Y, if QQ is less than approximately zero.

31. A method of processing a phase-modulated signal, the steps comprising:

receiving the phase -modulated signal having a first carrier phase within a first range;

translating said phase-modulated signal into a value having a second carrier phase within a second range; and providing said value to a look-up table for outputting a stored value associated with said second value;

said value comprising an X component and a Y component;

dividing said X component by two.

32. A method of processing a phase-modulated signal, the steps comprising:

receiving the phase-modulated signal having a first carrier phase with a first range;

translating said phase-modulated signal into a value having a second carrier phase within a second range; and providing said value to a look-up table for outputing a stored value associated with said second value;

said first range comprising approximately three-hundred and sixty degrees; and said second range comprising less than ninety degrees.

33. The method of claim 32 wherein said less than ninety degrees comprises approximately twenty-two and ½ degrees.

* * * * *